United States Patent
Fergen et al.

(10) Patent No.: US 10,623,605 B2
(45) Date of Patent: Apr. 14, 2020

(54) METHOD FOR IMAGE INSPECTION OF PRINTED PRODUCTS USING ADAPTIVE IMAGE SMOOTHING

(71) Applicant: HEIDELBERGER DRUCKMASCHINEN AG, Heidelberg (DE)

(72) Inventors: Immanuel Fergen, Karlsruhe (DE); Frank Schumann, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 16/268,562

(22) Filed: Feb. 6, 2019

(65) Prior Publication Data
US 2019/0246005 A1 Aug. 8, 2019

(30) Foreign Application Priority Data
Feb. 6, 2018 (DE) .................. 10 2018 201 794

(51) Int. Cl.
*H04N 1/409* (2006.01)
*G06K 9/03* (2006.01)
(Continued)

(52) U.S. Cl.
CPC ....... *H04N 1/4092* (2013.01); *B41F 33/0036* (2013.01); *G06K 9/03* (2013.01);
(Continued)

(58) Field of Classification Search
None
See application file for complete search history.

(56) References Cited

U.S. PATENT DOCUMENTS 8,295,565 B2 * 10/2012 Gu ................. G06T 5/007
382/128
8,599,299 B2 * 12/2013 Fredlund ............ H04N 1/0044
348/333.11
(Continued)

FOREIGN PATENT DOCUMENTS

DE 102015203628 A1 10/2015
DE 102016224307 A1 6/2017
JP 2003141520 A 5/2003

*Primary Examiner* — Dung D Tran
(74) *Attorney, Agent, or Firm* — Laurence A. Greenberg; Werner H. Stemer; Ralph E. Locher

(57) ABSTRACT

A method for image inspection of printed products in a printing material processing machine includes using an image sensor to capture and digitize printed products during image inspection by an image capture system, using a computer to carry out a comparison of captured digital printed images with a digital reference image, examining a result of the comparison for image regions with blurry regions in the captured digital printed image, calculating suitable smoothing factors for the blurry image regions, and then carry out smoothing of the digital reference image with the calculated, suitable smoothing factors for the blurry image regions, causing the digital reference image to have a blurriness comparable to the captured digital printed image in the image regions. Printed products detected as faulty are removed upon an occurrence of deviations of the captured digital printed image from the digital reference image.

6 Claims, 4 Drawing Sheets

(51) Int. Cl.
    *B41F 33/00*   (2006.01)
    *G06T 5/00*    (2006.01)
    *G06T 5/20*    (2006.01)
    *G06T 7/00*    (2017.01)

(52) U.S. Cl.
    CPC ............... *G06T 5/002* (2013.01); *G06T 5/20* (2013.01); *G06T 7/001* (2013.01); *G06T 2207/30144* (2013.01)

(56) References Cited

U.S. PATENT DOCUMENTS

| | | | |
|---|---|---|---|
| 9,256,931 B2* | 2/2016 | Bless | B41F 33/0036 |
| 9,641,700 B2 | 5/2017 | Schumann et al. | |
| 9,704,236 B2* | 7/2017 | Kogan | H04N 1/56 |
| 9,799,102 B2* | 10/2017 | Carr | G06T 5/002 |
| 9,953,435 B2 | 4/2018 | Fergen et al. | |
| 2005/0240376 A1* | 10/2005 | Uwatoko | G03G 15/55 |
| | | | 702/183 |
| 2010/0039510 A1* | 2/2010 | Gold | G06Q 30/0603 |
| | | | 348/92 |
| 2012/0070040 A1 | 3/2012 | Vans et al. | |
| 2013/0044347 A1* | 2/2013 | Kitai | H04N 1/4092 |
| | | | 358/1.14 |
| 2013/0148987 A1* | 6/2013 | Arakawa | G03G 15/5062 |
| | | | 399/15 |
| 2014/0313538 A1* | 10/2014 | Kitai | H04N 1/4092 |
| | | | 358/1.14 |
| 2016/0031246 A1 | 2/2016 | Sreekumar et al. | |
| 2016/0188993 A1* | 6/2016 | Beato | G06K 9/46 |
| | | | 382/163 |
| 2016/0292526 A1 | 10/2016 | Ukishima | |
| 2018/0061020 A1* | 3/2018 | Hiasa | G06T 3/60 |
| 2018/0121756 A1* | 5/2018 | Becker | G06K 9/00469 |

* cited by examiner

METHOD FOR IMAGE INSPECTION OF PRINTED PRODUCTS USING ADAPTIVE IMAGE SMOOTHING

CROSS-REFERENCE TO RELATED APPLICATION

This application claims the priority, under 35 U.S.C. § 119, of German Patent Application DE 10 2018 201 794.8, filed Feb. 6, 2018; the prior application is herewith incorporated by reference in its entirety.

BACKGROUND OF THE INVENTION

Field of the Invention

The invention relates to a method for the image inspection of printed products with the use of adaptive smoothing.

The invention lies in the technical field of automatic quality control.

Currently in the printing industry, in particular in relatively large printing machines, quality control is carried out automatically through so-called in-line inspection systems, which are referred to below as image capture systems. In that case, in-line means that the image capture system, more precisely the camera of the image capture system, is fitted in the printing machine. The image capture system is usually fitted after the last printing unit or, if present, a further post-treatment processing station, such as for example a varnishing unit, and detects the printed products produced by the printing machine. The image capture system can be a camera or else a camera system with multiple cameras. The use of other image sensors is also possible. For simplicity, however, mention is made of "camera" in the following. The digital printed images generated in that way by using the camera are then compared with appropriate good images of the printing subject in an image processing computer. Those good images can either be created from the prepress data or they can be learned. In that case, learning means that a series of printed products are printed with the printing subject to be produced and are captured by the camera of the image capture system. Those sample prints should be as defect-free as possible and therefore, following capture by the image capture system, they are stored as a good image as a digital reference in the image processing computer. In the continuous printing process, the printed image produced or parts thereof is/are captured by the camera of the image capture system and compared with the digitally learned good image reference or that created from the pre-press data. If deviations between the printed products produced in continuous printing and the digital reference are determined, then those deviations are indicated to the printer, who can then decide whether the deviations are acceptable or whether the printed products produced in that way are to be removed as waste. The printing sheets detected as waste can be removed through a waste diverter. It is of enormous importance in this case that both the good image reference is defect-free and that the printed image really printed and captured by the image capture system also actually corresponds to the real printed image. Faults which arise as a result of the image recording, for example as a result of deficient lighting, a dirty lens of the camera or other sources of influence, must not have a negative influence on the inspection process.

A very specific problem which negatively influences the inspection in particular from that point of view is constituted by irregularities in the printing substrate transport within the printing machine. The image capture system for good image recording depends on the fact that the transported printing substrate is transported as smoothly and uniformly as possible past the camera of the image capture system. In particular in sheet-fed printing machines, that is very demanding. In that case, a known problem arises in that during the transport of the printing sheets, the sheet trailing edge starts to oscillate during the transport over the sheet transport guide plate, that is to say it flaps up and the sheet end "flutters," so to speak. While that does not constitute a problem for the image capture of the start and middle region of the sheet, printed images to be examined which are placed at the sheet end on the printing sheet are influenced negatively by such "fluttering." As a result of the varying distance of the sheet surface to the camera, that therefore leads to a slight, varying blurriness in the form of non-linear distortion in the captured printed image. Since the blurring is of course not present in the digital reference, it is classified as a printing defect during a comparison of the captured, recorded printed image with the digital reference. In the event of manual monitoring of the image inspection method by a printer, the printer will of course detect that it does not involve true printing defects and knows to classify those erroneous indications accordingly. However, for completely automated image inspection, it would be necessary to rule out such false positive defects or pseudo-defects from the start.

In order to compensate for those distortions, in most cases nowadays the reference image is smoothed. That smoothing takes place uniformly over the entire sheet, the entire reference image.

However, in those cases such as those of "fluttering," where the camera systems do not image the entire sheet sharply but only image the same in a blurry manner in the edge region, uniform smoothing does not supply optimal results in the regions which are imaged in a blurry manner.

Therefore, Japanese Patent Application JP 2003 141520 A discloses an image reader having modules to compensate for the geometric distortion as a result of inclined scanning by using a distortion factor, wherein the factor is matched to the locally different distortion. However, the local image distortion factor used in that case does not correspond to the blurriness which is caused by a moving image original, that is to say a printing sheet. With the method disclosed therein, in addition it is possible to compensate for only linear distortions but not non-linear distortions, such as those which occur in sheet-fed offset printing as a result of the aforementioned flapping up of the sheet trailing edge.

SUMMARY OF THE INVENTION

It is accordingly an object of the invention to provide a method for image inspection of printed products using adaptive image smoothing, which overcomes the hereinafore-mentioned disadvantages of the heretofore-known methods of this general type and which largely avoids false positive defects.

With the foregoing and other objects in view there is provided, in accordance with the invention, a method for the image inspection of printed products in a machine processing printing materials by using a computer, wherein, within the context of the image inspection by an image capture system, the printed products produced are captured and digitized by using at least one image sensor, the captured digital printed images thus produced are compared with a digital reference image by the computer, the computer previously subjects the digital reference image to smoothing and, in the event of deviations of the captured digital printed images from the digital reference image, the printed products detected as faulty are removed. Before the smoothing of the digital reference image, the computer carries out a comparison of the captured digital printed images with the digital reference image, the result of the comparison is examined for image regions with blurry regions in the captured digital printed image, suitable smoothing factors are calculated for these blurry image regions, and the smoothing of the digital reference image is then carried out with the calculated, suitable smoothing factors for these blurry image regions, so that in these image regions the digital reference image has a blurriness comparable to the captured digital printed image.

In order to prevent the image distortion in the relevant region of the printing substrate from interfering with the image inspection, these effects must be removed from the comparison between the captured printed image and the digital reference image. Instead of having to re-equalize the distorted regions in the captured printed image, which of course is likewise possible but also relatively complicated, it is normally more expedient to process the reference image in such a way that it likewise has these systematic distortion effects. This is done by using suitable smoothing factors, which are applied to the digital reference image. However, since the systematic distortion effects act only on a specific region of the printing substrate, it is of course necessary to ensure that in fact only smoothing factors for this distorted region are also determined, calculated and applied. The simplest method resides in using the differences resulting from a comparison between the captured, printed image and the digital reference image to determine the correspondingly distorted regions in the printed image. Such a differential image very clearly shows artifacts in the distorted regions. Of course, the differential image also contains true printing defects which, although they are certainly to be found within the context of the image inspection, can be distinguished very clearly and simply from the systematic distortion effects by their appearance. Thus, by using the computer, the regions having the systematic, non-linear distortion effects can be isolated very simply from the differential image. The computer can then calculate suitable local smoothing factors by using the thus determined regions. The digital reference image is then reworked with these local smoothing factors, so that the reference image can be used for the comparison with the real captured printed images. The image inspection is thus carried out uninfluenced by these local non-linear distortions and is thus substantially more efficient, since no more of such types of false positive defects are produced within the context of the image inspection.

One preferred development of the method according to the invention is that the calculation of the smoothing factors is carried out during the learning phase of the image capture system at the start of each print job, individually for the specific captured digital printed images of this print job. The determination of the distorted image regions and corresponding calculation of the smoothing factors that are suitable therefor can be carried out during the learning phase of the image capture system, which is needed in any case, at the start of each print job. Therefore, the image capture system is immediately ready for use with the method according to the invention at the start of the actual continuous printing of the print job. The determination of the distorted regions by using the comparison between the digital reference image and the captured real printed image is of course always possible only for the respective specific printed images. Whether individual printed images which are located in the corresponding substrate regions are compared individually with one another or as a type of combined overall image, is not critical in this case for the functioning of the method according to the invention.

Another preferred development of the method according to the invention is that, to calculate the smoothing factors by using the computer during the learning phase of the image capture system at the start of each print job, a plurality of captured digital printed images are compared with the digital reference image, wherein a selection is made from the results of this comparison by using mathematical operators. The fact that the method according to the invention is carried out within the context of the learning phase of the image capture system for a plurality of captured digital printed images means that the determination of the distorted image regions and the calculation of the local smoothing factors, which follows therefrom and depends thereon, can be refined appropriately. This is important in particular since although the inconsistent printing substrate transport always leads to a similar defect image in the form of the local non-linear distortions, the exact effects on the local distortions as a result of the "fluttering" of the sheet trailing edge can easily be distinguished in each image recording. It is therefore expedient to make multiple recordings and to evaluate them according to the invention in order to compensate for these fluctuations appropriately and also to compensate for other measurement errors which can always occur during the image recording of the image capture system. From the multiple results that are thus present, it is then possible by using an extremely wide range of mathematical operators to determine a distortion which is close to reality, with which optimally suitable local smoothing factors can be calculated.

A further preferred development of the method according to the invention is that the selection by using mathematical operators by the computer includes the calculation of average values, median values, minimum and maximum values of the comparison results. Which mathematical operators are then exactly used depends on the respective priorities. It appears to be most expedient to use the average values from the multiple results for the local image distortion that are present. However, if the captured values are very highly scattered, counter to expectation, the use of median values also certainly makes sense. Also, the use of minimum values or maximum values can certainly be applied in individual cases with respect to the local image distortions.

An added preferred development of the method according to the invention is that, in addition or as an alternative to the smoothing of the digital reference image, the computer carries out smoothing of the captured digital printed image that is currently to be compared, in each case before the comparison of the captured digital printed images with the digital reference image. As already mentioned, it is also possible, instead of smoothing the digital reference image, to appropriately distort all the artifacts, instead of unsmoothing or equalizing the respectively captured digital printed image accordingly. However, this procedure has the disadvantage that the calculated smoothing factors then have to be re-applied each time to each recorded digital printed image before the comparison with the digital reference image. The converse procedure, namely of smoothing the digital reference image, has the advantage that for the relevant printed image, adaptation by applying the calculated local smoothing factors is thus necessary only once. Once the digital reference image has been smoothed once appropriately, then it can be used within the context of the normal image inspection for all of the correspondingly captured digital printed images, without renewed application of the calculated local smoothing factors being necessary. Nevertheless, it can of course be absolutely expedient to carry out the method according to the invention once more at regular intervals for the digital reference image since, within the scope of a print job, the local distortion effects caused by the inconsistent printing substrate transport can quite possibly also change.

An additional preferred development of the method according to the invention is that, at regular intervals during the image inspection, updated smoothing factors for the distorted image regions are once more calculated with current, captured digital printed images, and the digital reference image is appropriately modified therewith. Once the digital reference image has been smoothed appropriately once more, then it can be used within the context of the normal image inspection for all correspondingly captured digital printed images without renewed application of the calculated local smoothing factors being necessary. Nevertheless, it may of course be expedient to carry out the method according to the invention once more at regular intervals for the digital reference image since, within the context of a print job, the local distortion effects caused by the inconsistent printing substrate transport can quite possibly change.

Another preferred development of the method according to the invention is that the machine processing printing materials is a sheet-fed printing machine, wherein the printed products produced are printed on printing sheets. In principle, the method according to the invention can be applied to most types of printing machines. In particular, the specific local distortions during the substrate transport primarily occur in printing sheets, however, since in particular, during the sheet transport, the individual printing sheets can exhibit the corresponding oscillations, that is to say fluttering of the sheet end, as a result of striking the sheet guide plates. The method according to the invention is therefore particularly suitable for sheet-fed printing machines and for the image inspection of printed products produced with such a sheet-fed printing machine.

A concomitant preferred development of the method according to the invention is that the sheet-fed printing machine is an inkjet or an offset printing machine. Primarily, the method according to the invention is currently used in sheet-fed offset printing machines, but use in an inkjet sheet-fed printing machine is also imaginable.

Other features which are considered as characteristic for the invention are set forth in the appended claims.

Although the invention is illustrated and described herein as embodied in a method for image inspection of printed products using adaptive image smoothing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention as such and structurally and/or functionally advantageous developments of the invention will be described in more detail below with reference to the associated drawings and by using at least one preferred exemplary embodiment.

DETAILED DESCRIPTION OF THE INVENTION

Figure 1:
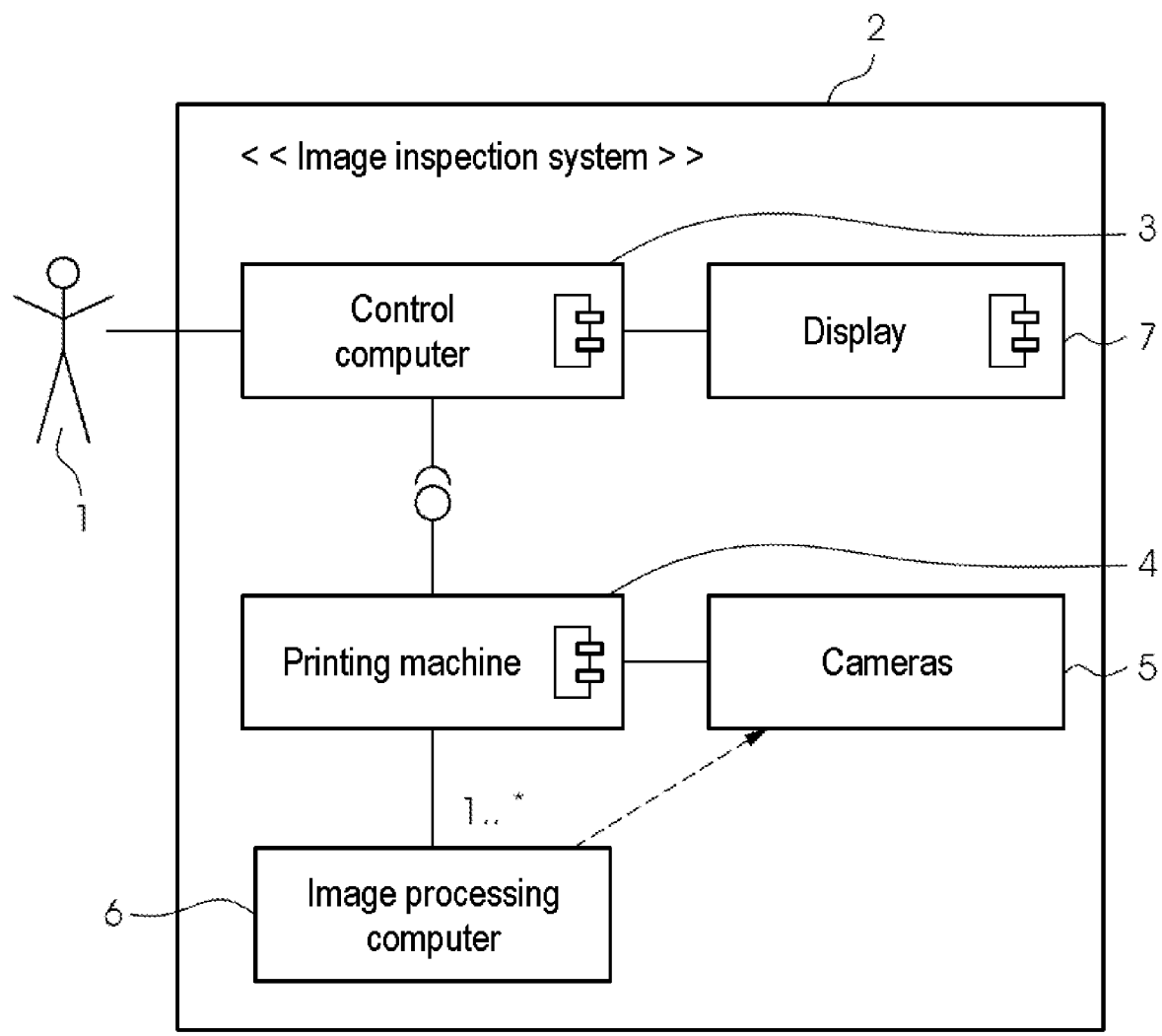
FIG. 1 is a block diagram showing an example of a sheet-fed inkjet printing machine.

Referring now in detail to the figures of the drawings, in which mutually corresponding elements are each provided with the same designations, and first, particularly, to FIG. 1 thereof, there is seen an example of an image capture system 2 used by the method according to the invention. The system 2 includes at least one image sensor 5, usually a camera 5, which is integrated in a sheet-fed printing machine 4. The at least one camera 5 records printed images produced by the printing machine 4 and transmits data to a computer 3, 6 for evaluation. The computer 3, 6 can be a dedicated separate computer 6, for example one or more specialized image processing computers 6, or else it can be identical to a control computer 3 of the printing machine 4. At least the control computer 3 of the printing machine 4 has a display 7, on which the results of the image inspection are displayed.

Figure 2:
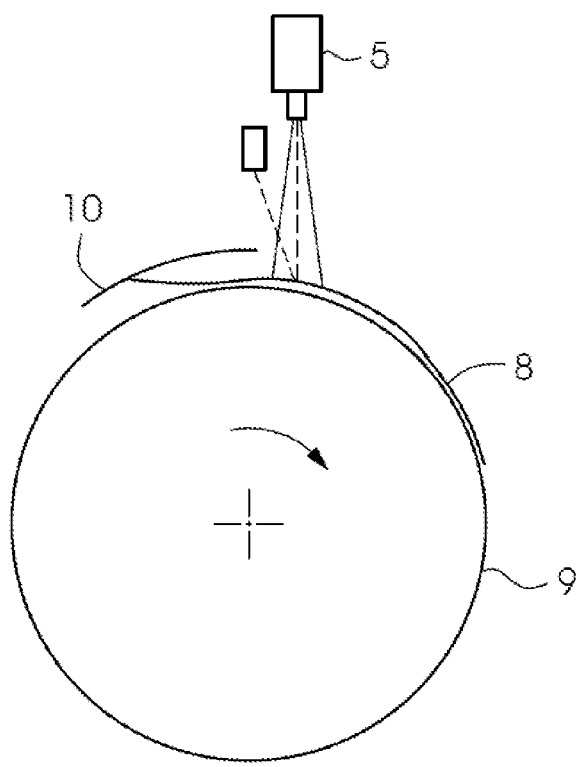
FIG. 2 is a side-elevational view showing, by way of example, the occurrence of "fluttering" at the sheet trailing edge.
Figure 5:
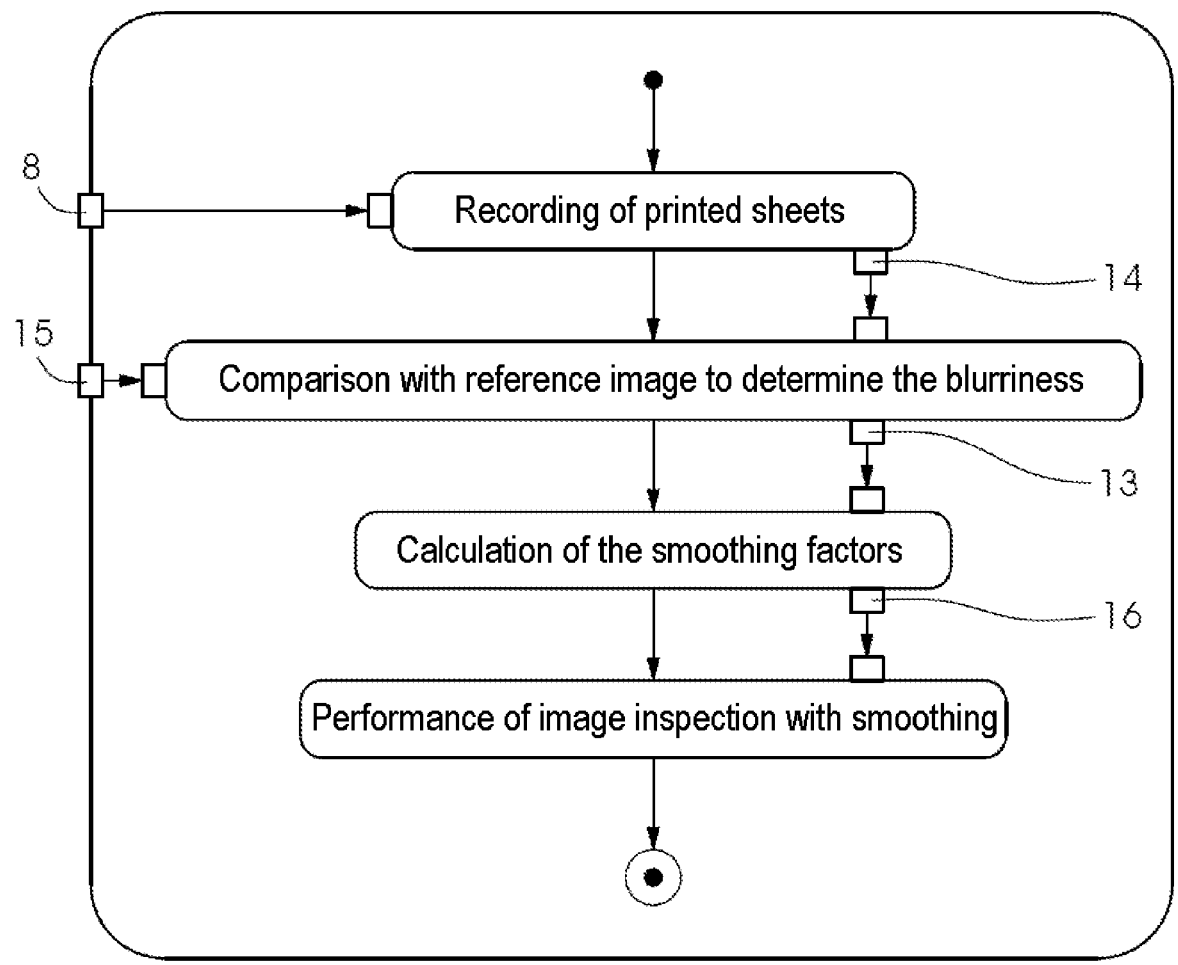
FIG. 5 is a flow chart showing the sequence of the method according to the invention.

With regard to its sequence, a preferred structural variant of the method according to the invention itself is illustrated schematically in FIG. 5. During the transport of a printing sheet 8 in the sheet-fed offset printing machine 4, oscillations occur, particularly at the sheet end, which effect fluttering of the sheet end, that in turn has a negative effect on the image recording of the camera 5 of the image capture system 2. This effect is illustrated structurally in FIG. 2. It can easily be seen in this case how the sheet transport over an impression cylinder 9 is controlled by a sheet guide plate 10. However, as soon as the sheet end leaves the sheet guide plate 10, mechanical stress charged up in the sheet 8 as a result of the transport between the impression cylinder 9 and the sheet guide plate 10 is discharged and slight oscillations causing the "fluttering" occur. The camera 5, which is installed shortly after a printing unit, captures the sheet 8 which was just printed and forwards a digital image 14 thus captured to the appropriate image processing computer 6. As a result of the slight "fluttering," however, the distance between the printed sheet 8 and the camera 5 changes slightly at high frequency. As a result, there is slight blurriness at the end of the fluttering sheet 8. This blurriness causes regions having local non-linear distortions 11 in the printed image, which cause pseudo-defects in the image inspection, that previously had to be assessed manually by a user 1 of the printing machine 4.

Figure 3:
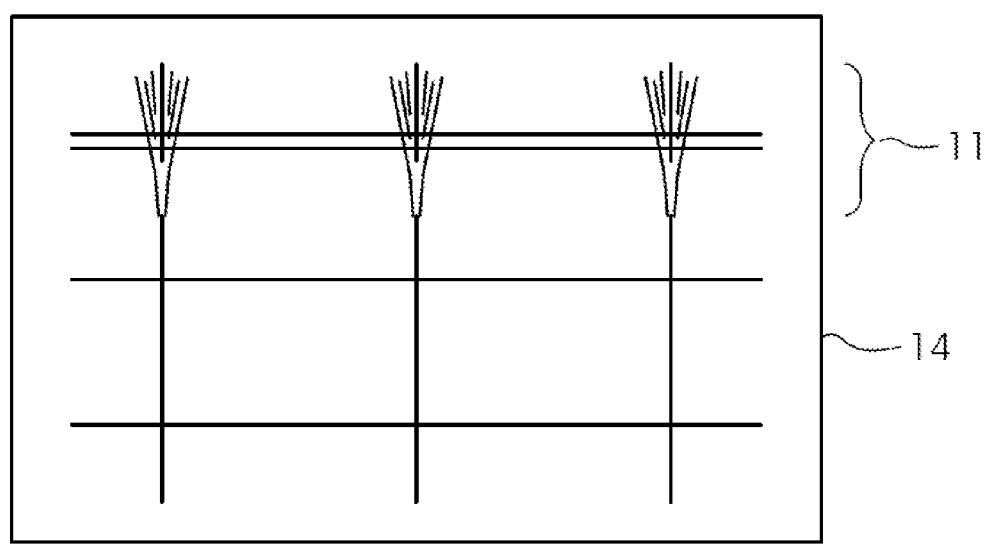
FIG. 3 is a plan view showing an example of a resulting, local image distortion at the sheet trailing edge.

An example of such a printed image 14 with local non-linear distortion 11 at the sheet end is illustrated schematically in FIG. 3. As can easily be seen in this case, the local distortions 11 do not exist at the start and in the middle of the sheet 8 or of the corresponding printed image 14. However, they arise or intensify the more the printed image 14 approaches the sheet end.

Figure 4:
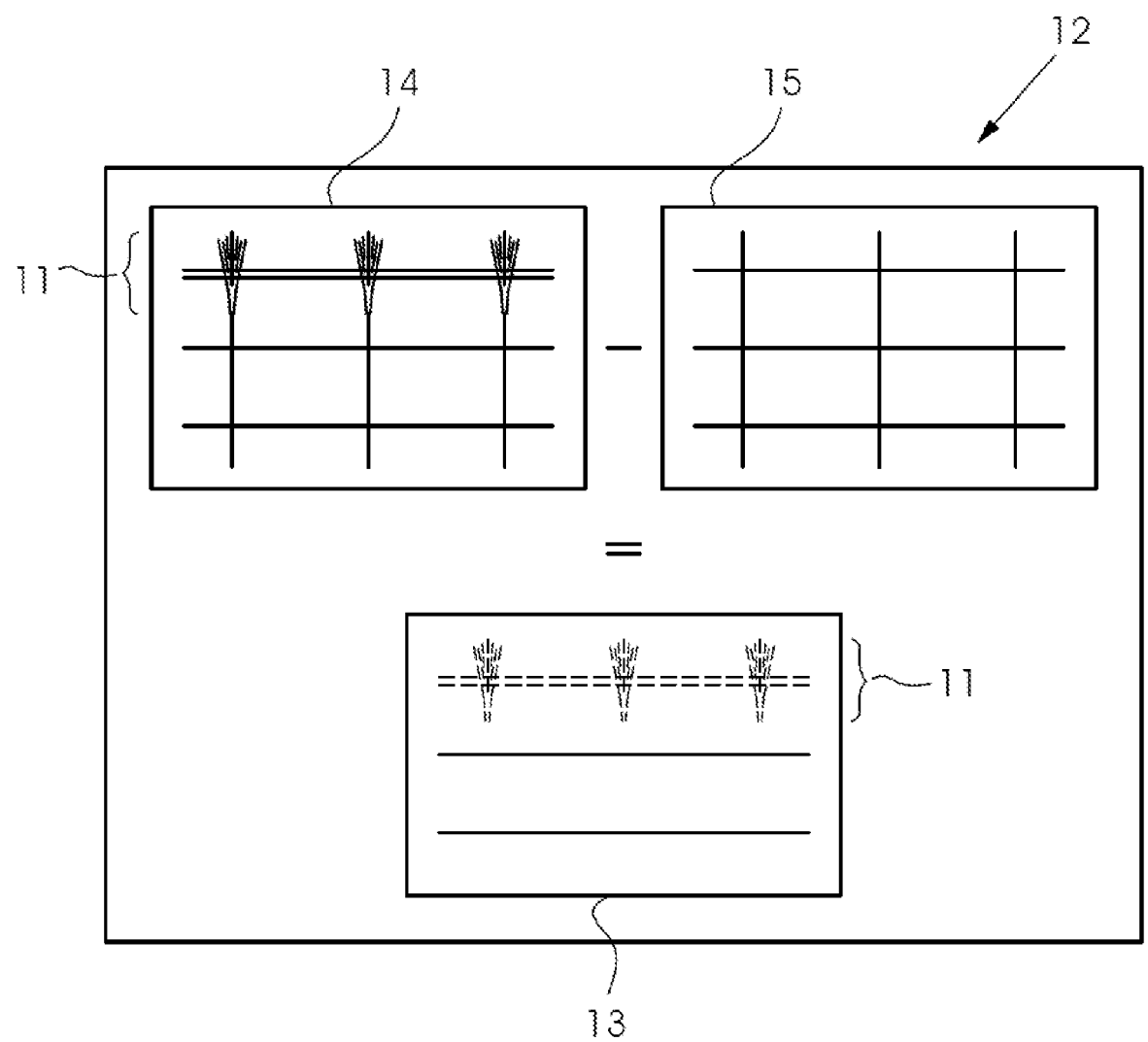
FIG. 4 is a plan view showing a differential image from an image inspection with resulting local image distortion.

The preferred exemplary embodiment of the method according to the invention for a current print job now appears in such a way that, within the context of a learning phase of the image capture system 2, a corresponding digital reference image 15 is created from the digital pre-press data and can then be compared with the captured digital printed images 14 in the image inspection. In order to determine local smoothing factors 16, in the learning phase the printed image to be produced is printed at least once but preferably repeatedly on the printing sheet 8 and recorded by the image capture system 2. The digital printed images 14 thus captured are compared with the digitally present reference image 15 by the image processing computer 6 in a further method step. A differentiation 12 carried out results in a corresponding differential image 13, as can be seen in FIG. 4. This differential image 13 now has all of the deviations of the real captured digital printed image 14 from the defect-free digital reference 15. In the differential image 13, it is particularly easily possible to see the corresponding deviations at the locations 11, at which the local non-linear distortions have influenced the captured digital printed image 14. This fact is illustrated schematically in FIG. 5. The image processing computer 6 then detects the regions 11 in the local printed image which have been caused or influenced by the non-linear distortion. Since these local distortions 11 in the differential image 13 have a very specific appearance, they can very easily be isolated and detected automatically by the image processing computer 6. The image processing computer 6 is then capable of calculating local smoothing factors 16 for the thus isolated regions 11 having the local non-linear distortions. In the next method step, the image processing computer 6 modifies the digital reference image 15 in the relevant regions 11, which it could have identified by using the differential image 13, with the smoothing factors 16 calculated in this way. A digital reference image which likewise has such non-linear local distortions in the relevant image regions 11 is thus obtained. This digital reference image 13, which has been modified with the calculated local smoothing factors 16, is then used within the context of the normal image inspection. A comparison of the captured digital printed images 14 with this modified digital reference image then exhibits only printing defects that are really present and possibly other pseudo-defects, but no longer exhibits deviations 11 which have been caused by the local non-linear distortions. Since the latter are present in both images, namely the digital modified reference image and the captured digital printed image 14, they cancel one another out in a comparison.

The local smoothing according to the invention therefore reliably eliminates pseudo-defects caused by distance effects and thus supplies improved inspection results.

The following is a summary list of reference numerals and the corresponding structure used in the above description of the invention:
1 User
2 Image capture system
3 Control computer
4 Printing machine
5 Image sensor
6 Image processing computer
7 Display
8 Printing sheet
9 Impression cylinder
10 Guide plate
11 Regions with local distortions
12 Differentiation between digital reference image and captured printed image
13 Differential image
14 Captured printed image
15 Digital reference image
16 Calculated smoothing factors

The invention claimed is:

1. A method for the image inspection of printed products in a printing material processing machine, the method comprising the following steps:
   using at least one image sensor to capture and digitize produced printed products during an image inspection by an image capture system;
   using a computer to carry out a comparison of captured digital printed images with a digital reference image;
   examining a result of the comparison for image regions with blurry regions in the captured digital printed image;
   calculating suitable smoothing factors for the blurry image regions;
   carrying out the calculation of the smoothing factors by the computer during a learning phase of the image capture system at a start of each print job, individually for specific captured digital printed images of the print job;
   comparing a plurality of captured digital printed images with the digital reference image and making a selection from results of the comparison by using mathematical operators, in order to calculate the smoothing factors by using the computer during the learning phase of the image capture system at the start of each print job;
   then carry out smoothing of the digital reference image with the calculated, suitable smoothing factors for the blurry image regions, causing the digital reference image to have a blurriness comparable to the captured digital printed image in the image regions; and
   removing printed products detected as faulty upon an occurrence of deviations of the captured digital printed image from the digital reference image.

2. The method according to claim 1, which further comprises calculating average values, median values, minimum and maximum values of the comparison results in the selection by using mathematical operators by the computer.

3. The method according to claim 1, which further comprises in addition or as an alternative to the smoothing of the digital reference image, using the computer to carry out smoothing of the captured digital printed image to be currently compared, in each case before the comparison of the captured digital printed images with the digital reference image.

4. The method according to claim 1, which further comprises calculating updated smoothing factors once more for distorted image regions with current, captured digital printed images, and appropriately modifying the digital reference image therewith, at regular intervals during the image inspection.

5. The method according to claim 1, which further comprises printing the printed products on printing sheets by using a sheet-fed printing machine as the printing material processing machine.

6. The method according to claim 5, which further comprises using an inkjet or an offset printing machine as the sheet-fed printing machine.

* * * * *